(No Model.)
W. CLOUSER.
CASKET TRUCK.
No. 576,256. Patented Feb. 2, 1897.
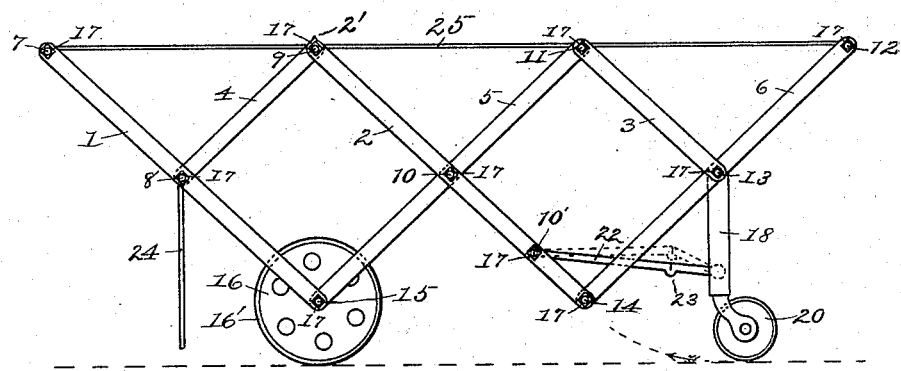
Fig. 1.
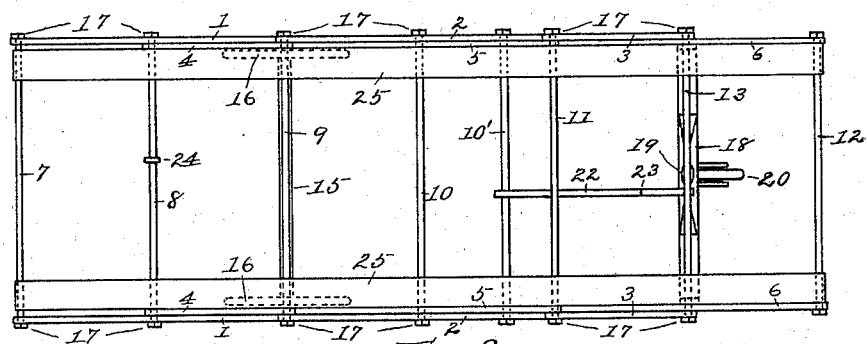
Fig. 2.
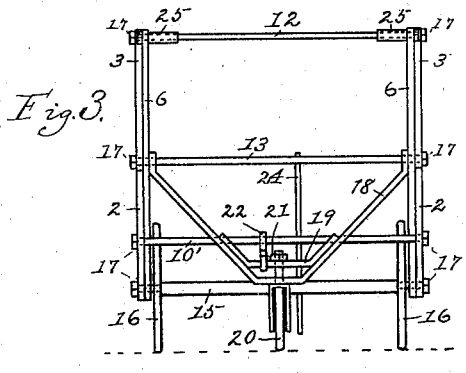
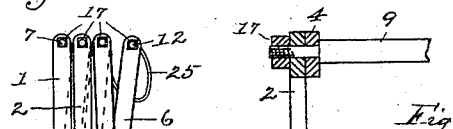
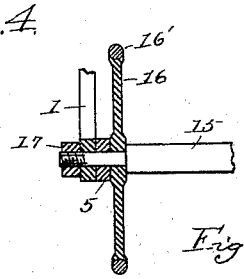
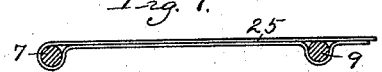
WITNESSES:
Albert M. Mackerley
John Meyers
INVENTOR:
William Clouser,
BY Eugene L. Arnott,
ATTORNEY.
THE NORRIS PETERS CO., PHOTO-LITHO., WASHINGTON, D. C.

UNITED STATES PATENT OFFICE.

WILLIAM CLOUSER, OF GREENFIELD, OHIO.

CASKET-TRUCK.

SPECIFICATION forming part of Letters Patent No. 576,256, dated February 2, 1897.

Application filed February 24, 1896. Serial No. 580,559. (No model.)

*To all whom it may concern:*

Be it known that I, WILLIAM CLOUSER, a citizen of the United States, residing at Greenfield, in the county of Highland and State of Ohio, have invented certain new and useful Improvements in Casket-Trucks, of which the following is a specification, reference being had to the accompanying drawings.

This invention relates to casket-trucks designed for use in conveying or moving caskets or coffins in churches or other places.

The object of the invention is to provide a casket-truck which, while substantial and efficient in use, may be folded together in a comparatively small space.

An undertaker often has occasion to carry a casket-truck in a buggy or other vehicle, and the space occupied by the truck is an important item. It is also often desirable, when a casket or coffin is being carried out through a church-door, that the truck may be folded compactly and placed out of the way of the people passing down the aisle.

The novelty of the invention will be hereinafter fully set forth, and pointed out in the claims.

In the accompanying drawings, Figure 1 is a side elevation of a casket-truck embodying my invention. Fig. 2 is a top or plan view, and Fig. 3 is an end view, of the same. Fig. 4 is a side elevation of the truck when folded. Fig. 5 is a detail view, partly in section, showing how the cross-bars are journaled in the side-bars. Fig. 6 is a detail view, partly in section, showing how the axle is journaled in the wheels and also in the side-bars. Fig. 7 is a detail view showing how the straps may be secured to the cross-bars.

The same reference-figures represent identical parts in the different views.

In the drawings the three bars designated by the numerals 1, 2, and 3 are arranged longitudinally with the truck and extend forward and downward. Three similar bars 4, 5, and 6 are also arranged longitudinally with the truck and extend forward and upward. These bars are preferably of iron or steel of suitable dimensions. Bars 4, 5, and 6 are placed in contact with the bars 1, 2, and 3 on their inner sides. These bars 1, 2, 3, 4, 5, and 6 form one side of the truck. The other side of the truck is the same. A cross-bar or cross-tie 7 extends between and is journaled in the upper ends of bars 1 1. A cross-bar 8 extends between and is journaled in the lower ends of bars 4 4 and the central parts of bars 1 1. A cross-bar 9 extends between and is journaled in the upper ends of bars 4 4 and 2 2. A cross-bar 10 extends between and is journaled in the central parts of bars 2 2 and 5 5. A cross-bar 11 extends between and is journaled in the upper ends of bars 3 3 and 5 5. A cross-bar 12 extends between and is journaled in the upper ends of bars 6 6. A cross-bar 13 extends between and is journaled in the lower ends of bars 3 3 and the central portions of bars 6 6. A cross-bar 10' extends between and is journaled in the lower portions of bars 2 2.

The lower ends of bars 2 2 and 6 6 are pivotally joined together by bolts 14. The axle 15 is journaled in wheels 16 and also in the lower ends of bars 1 1 and 5 5. These cross-bars preferably have their ends reduced, thus forming shoulders, the reduced parts being screw-threaded at their outer ends to receive the nuts 17, as represented in Fig. 5. The shoulders rest against the side-bars, while the nuts hold said bars in position. The axle 15 is also reduced at its ends, the shoulders fitting against the wheels 16 and the nuts being outside of bars 1 1, as shown in Fig. 6.

With the arrangement described the bars 1 2 3 and 4 5 6 are pivotally connected together, the ends of cross-bars 7, 8, 9, 10, 11, 12, and 13, the bolts 14, and the axle 15 serving as pivotal points. The purpose in this will presently appear.

The side-bars 3 3 and 4 4 are only about one-half the length of the other side-bars.

A bent cross-bar 18 extends across between the central portions of bars 6 6. The cross-bar 13 passes through the upturned ends of this bent cross-bar 18, thus forming a pivotal point for the latter. The bar 18 extends from each end downward to the center or to points near the center, thus forming the shape of a V with a broad top. A short bar 19 extends across the V of bar 18 near the center, being riveted at its ends to bar 18. A caster 20 has its shank extended up through the center of bar 18 and the center of bar 19, where it is held by nut 21.

A brace-bar 22, jointed at 23, has one end pivotally attached to cross-bar 10' and the other end pivotally attached to the short cross-bar 19.

A rod 24 is pivotally depended from cross-bar 8 to prevent the truck from tilting.

Side-bars 2 2 have sharp points 2' 2' at their upper ends to prevent the casket or coffin from slipping.

Wheels 16 are preferably provided with rubber tires 16'.

A strap 25 at either side extends longitudinally along the top of the truck over cross-bars 7 9 11 12, to which cross-bars it is attached. One method of attaching is shown in Fig. 7, in which the strap is brought around the cross-bar 7 and then glued or sewed and then carried to the cross-bar 9, passing around it and being glued or sewed there also. This strap 25 is preferably made of webbing, but may be made of leather or other material.

The straps 25 25 hold the cross-bars 7 9 11 12 in normal position and prevent the side-bars from lengthening out and sinking down, as they would obviously do without the straps, having no vertical supports.

When the truck is to be folded, the brace-bar 22 is raised at the center to the position shown in dotted lines in Fig. 1, and the bent cross-bar 18, being pivotally held on the cross-bar 13 and carrying the caster 20, is swung around in the direction of the arrow and dotted lines. The upper ends of side-bars 1 1 and 6 6 are then drawn nearer and nearer together, the bars working on their pivotal points, as hereinbefore described, until they assume the position shown in Fig. 4, where they are brought close together and almost parallel. The strap 25 bends into folds or loops, as represented in Fig. 4. The truck, thus folded, is ready for transportation. When the truck is to be used again, the side-bars are simply drawn out into the position shown in Fig. 1 and the brace-bar 22 is placed in position.

Having thus fully described my invention, what I claim as new, and desire to secure by Letters Patent, is—

1. A casket-truck having at either side two parallel side-bars, one in front of the other, extending forward and downward, two parallel side-bars, one in front of the other, extending forward and upward, each of said bars which extends forward and downward being pivotally connected at its lower end to a corresponding bar extending forward and upward, cross-bars connecting the side-bars at their upper and lower ends, the main wheels, a caster depended from said bars, means to hold said caster in position and means to prevent the upper ends of said side-bars from separating or lengthening out too far and sinking down, substantially as set forth.

2. In a casket-truck, the combination of the side-bars 1 and 2 extending forward and downward, the side-bars 5 and 6 extending forward and upward, the cross-bars 7 9 11 12 13 and 10', the bolts 14 and the axle 15 connecting said side-bars pivotally together, the bent cross-bar 18 depended from said cross-bar 13 and carrying the caster 20, and the brace-bar 22, jointed at 23, connecting said cross-bars 18 and 10', substantially as set forth.

3. In a casket-truck, the combination, of the side-bars and cross-bars, the strap 25, the wheels 16, the depended cross-bar 18, the short bar 19, and the caster 20, with shank extending up through said bars 18 and 19, and a brace-bar 22, substantially as set forth.

4. In a casket-truck, the combination of the side-bars pivotally connected and arranged to fold together, the cross-bars connecting said side-bars, and two of said side-bars being sharp-pointed at their upper ends to prevent the casket or coffin from slipping, substantially as set forth.

WILLIAM CLOUSER.

Witnesses:
ALBERT M. MACKERLEY,
JOHN MEYERS.